United States Patent
Coleman, Jr.

(10) Patent No.: US 10,148,200 B2
(45) Date of Patent: Dec. 4, 2018

(54) DEVICE AND METHOD FOR ELECTRICAL ENERGY SYNTHESIS

(71) Applicant: Shawn David Coleman, Jr., Chicago, IL (US)

(72) Inventor: Shawn David Coleman, Jr., Chicago, IL (US)

(*) Notice: Subject to any disclaimer, the term of this patent is extended or adjusted under 35 U.S.C. 154(b) by 173 days.

(21) Appl. No.: 15/230,405

(22) Filed: Aug. 6, 2016

(65) Prior Publication Data

US 2018/0041143 A1    Feb. 8, 2018

(51) Int. Cl.
| | |
|---|---|
| *H02J 7/34* | (2006.01) |
| *H02M 7/5387* | (2007.01) |
| *H02J 3/32* | (2006.01) |
| *G05F 1/455* | (2006.01) |
| *H02N 11/00* | (2006.01) |
| *H02J 1/10* | (2006.01) |

(52) U.S. Cl.
CPC .......... *H02N 11/008* (2013.01); *G05F 1/455* (2013.01); *H02J 3/32* (2013.01); *H02J 7/34* (2013.01); *H02J 1/102* (2013.01); *H02M 2007/53878* (2013.01)

(58) Field of Classification Search
CPC ..... H02N 11/002; H04R 29/003; G05F 1/455; H02J 3/32; H02J 7/34; H02M 2007/53878
See application file for complete search history.

(56) References Cited

U.S. PATENT DOCUMENTS

| | | | | |
|---|---|---|---|---|
| 3,863,120 A | * | 1/1975 | Rettig | H02P 3/065 318/701 |
| 5,356,534 A | | 10/1994 | Zimmermann et al. | |
| 5,731,670 A | * | 3/1998 | Galbiati | H02P 6/18 318/400.35 |
| 5,767,592 A | * | 6/1998 | Boys | H03K 3/57 256/10 |
| 6,679,179 B1 | * | 1/2004 | Bohl | F41H 13/0093 102/210 |
| 7,109,671 B2 | * | 9/2006 | Bedini | H02K 21/24 310/113 |
| 7,157,815 B2 | * | 1/2007 | Cordiale | F04B 17/046 310/24 |
| 7,268,503 B2 | * | 9/2007 | Yamasaki | B06B 1/0246 318/400.35 |
| 7,542,262 B2 | * | 6/2009 | Galbiati | G11B 5/022 361/139 |
| 7,947,918 B2 | * | 5/2011 | Buhler | B23H 1/022 219/69.18 |
| 9,209,720 B2 | | 12/2015 | Feldman et al. | |

(Continued)

FOREIGN PATENT DOCUMENTS

WO    WO-0205588 A2 *    1/2002    ...........    H03F 3/2173

OTHER PUBLICATIONS

Vladimir Utkin's Free-Energy Secrets—Mar. 2012; http://www.free-energy-info.com/Utkin.htm, all pages, 2012.*
Vladimir Utkin's Free-Energy Secrets—Mar. 2012.

*Primary Examiner* — Michael C Zarroli

(57) ABSTRACT

An aspect of the present invention provides a circuit and arrangement for generating and amplifying an electric scalar potential field and a method for capturing the associated available electromagnetic energy into the system. The device is comprised of a transformer whose primary is powered periodically by short pulse durations; a resonant coupled transformer secondary circuit with synchronous parameter variation; and an extraction circuit of appropriate impedance and components to provide isolation and distribution to load.

1 Claim, 2 Drawing Sheets

(56) References Cited

U.S. PATENT DOCUMENTS

| | | |
|---|---|---|
| 9,222,867 B2 | 12/2015 | Norling et al. |
| 9,230,730 B2 | 1/2016 | Heins |
| 9,240,742 B1 | 1/2016 | Erickson et al. |
| 9,263,948 B1 | 2/2016 | Vovos et al. |
| 9,263,977 B2 | 2/2016 | Yoshiya |
| 9,293,952 B2 | 3/2016 | Meeker |
| 9,374,852 B2 | 6/2016 | Bilchinsky et al. |
| 9,374,887 B1 | 6/2016 | Warne et al. |
| 9,379,431 B2 | 6/2016 | Flores-Cuadras et al. |
| 9,379,555 B2 | 6/2016 | Huynh |
| 9,379,572 B2 | 6/2016 | Ichikawa et al. |
| 9,379,573 B2 | 6/2016 | Byun et al. |
| 9,379,617 B2 | 6/2016 | Nishikawa |
| 9,379,627 B2 | 6/2016 | Fornage et al. |
| 9,379,630 B2 | 6/2016 | Miao |
| 9,379,650 B2 | 6/2016 | Chew et al. |
| 9,379,686 B2 | 6/2016 | Yun et al. |
| 9,379,733 B1 | 6/2016 | Lee |
| 9,379,798 B2 | 6/2016 | Guermandi et al. |
| 9,379,926 B2 | 6/2016 | Berretta et al. |
| 9,380,656 B2 | 6/2016 | Radermacher |
| 2008/0175404 A1* | 7/2008 | Bank ................ H03F 3/181 381/77 |

\* cited by examiner

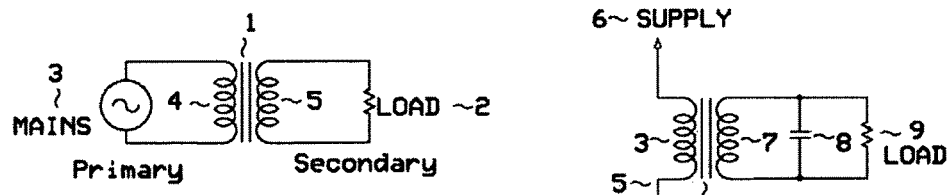
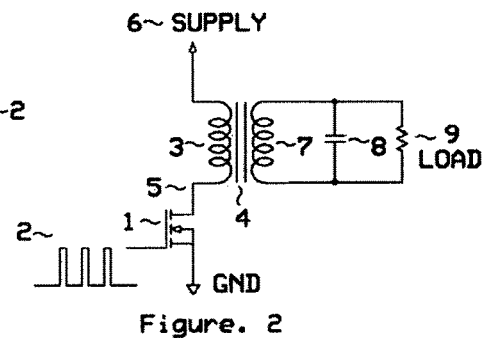
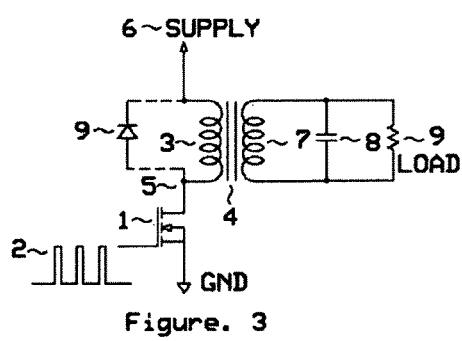
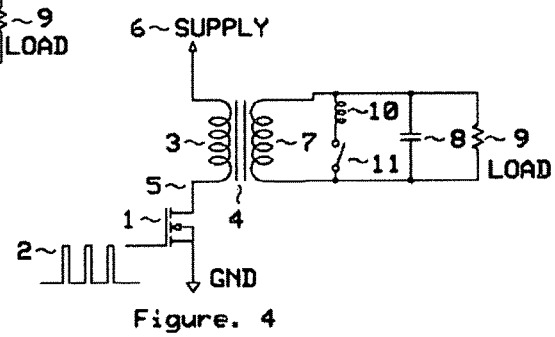
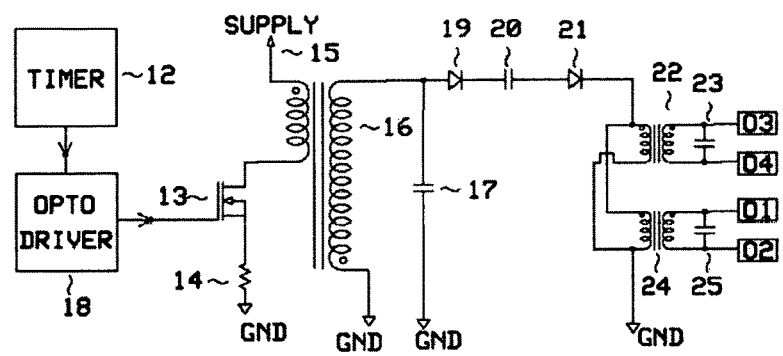

DEVICE AND METHOD FOR ELECTRICAL ENERGY SYNTHESIS

BACKGROUND OF INVENTIONS

The invention relates generally to the synthesis of electrical energy using a device and method of energy synthesis, phasing and switching of passive and reactive elements whereby the collection of energy return potential from the scalar superpotential field occurs in usable form to power a load without additional dissipation as power and work from a closed loop power source.

BACKGROUND INFORMATION AND RELATED ART

Refer to FIG. 1. Operation of a normal isolation transformer alternating current (AC) power supply consists of an isolation transformer (1) whose primary side (4) is being powered by a conventional current signal and induced EMF (electromotive force) of sinusoidal form from the mains power supply (3). The secondary side (5) of the isolation transformer then powers the load (2) by a current and EMF produced by the mutual induction of the magnetic flux linkages in the core of the isolation transformer. For the purposes of illustration, the load being powered is of a resistive nature. The EMF induced in the secondary side of the isolation transformer is directly proportional to the mutual inductance between the primary and secondary coils of the transformer and the change in current with respect to time in the primary coil of the isolation transformer. The conventional method of operating an isolation transformer is purely dissipative with respect to time from a sinusoidal signal from the view of the source since the source is at all times connected to the secondary coil by means of mutual induction between the secondary and the primary coils. This is due to the fact that power is the time-rate of performing work and work being defined by the dissipation of energy so, since there is a continuous sourcing of energy from the power source with respect to time, the power supply is a constant power supply source, which operates in a constant dissipative nature from the moving movement of electrons.

The Coefficient of Performance (COP) is typically used to represent the efficiency of the system. The COP is physically defined as the amount of energy dissipated by the load divided by the amount of energy supplied to the system by the power source. COP is also defined as the power output into the load divided by the power input into the generator-load combination. In an ideal system, if there are no internal losses then the COP of the system would be 1.0 meaning all the power input into the system from the source would be dissipated totally by the load.

In modern generators of electrical energy presently in use, there always exist losses due to internal resistance, parasitic and nonparasitic reactance, eddy and dielectric heating and, inefficient generator design. If the reactive elements (capacitor and/or inductor) are not balanced there would exist dissipation by means of reactive losses and since most electrical energy generators involve the use of conductors and switches, there will exist always some internal resistance and internal dissipation so the standard operation of a normal AC operated isolation transformer electrical generator would always produce a COP of less than one.

Bringing an electrical generator into resonance requires tuning the system with passive elements however in a typical AC generator system the load is continuously connected to the source to form a closed loop system and therefore considerably limits the COP of the system. In a unipolar generator system, an AC generator of equivalent power or more can be synthesized with a fraction of the time the physical power supply is connected to load to considerably reduce power consumption and capture excess energy.

Every point in space-time has a certain value of Webers associated with it. This is the scalar superpotential field ($\chi$). An electric scalar potential field ($\varphi$) is a potential field from which electric force fields derive. It is typically referred to as voltage field. It arises from the time derivative of the scalar superpotential ($d\chi/dt$). It is a scalar field with units of Volts or Webers/second. When the magnitude of flux at a point changes over time, a voltage or electric scalar potential exists there so, the electric scalar potential field $\varphi = d\chi/dt$.

The magnetic vector potential (A) is a potential field from which magnetic force fields derive. It derives from the gradient in the scalar superpotential ($\nabla\chi$). It is a vector field with units of Webers/meter. The scalar superpotential displacement surrounding and being dragged along a wire by an electric current is one example of the magnetic vector potential so, the magnetic vector potential $A = \nabla\chi$.

The electric field (E) is a field that imparts force on charged matter. It arises "either" from a gradient in the electric scalar potential ($\nabla\varphi$) or a time derivative of magnetic vector potential $dA/dt$. This is a force field with units of Volts/meter or Webers/meter-second. An electric field is essentially voltage changing over a distance, but is equivalently a time-changing magnetic vector potential field so, $E = -\nabla\varphi$ (a static electric field that is the slope of a voltage field that declines over some distance) and $E = -dA/dt$ (a dynamic electric field) and since the electric field cannot be described independently of the magnetic field, the electric field (better defined as a dielectric field) $E = -\nabla\varphi - dA/dt$.

In a unipolar switched electrical generator having an energized inductor component, the electric field equation has to account for its derivative effects in three states. These states consist of 1) switched on state; 2) on state; and 3) switched off state. During the switched on state, the inductor is instantaneously charged to the physical supply voltage then discharges with time as the current builds up in the inductor to such point in time where the current is at its steady state value whereby no potential difference exists across the inductor coil. At such time where the circuit is in a steady state mode of operation, the circuit is considered to be in its on state. In both the switched on state and the on state, the circuit is being supplied energy by the physical power source and the voltage field across the circuit eventually takes on the value of the physical power source. The magnetic vector field is a function of the current translated along the wire and if the current through the inductor ramps up with respect to time, so does the magnetic vector potential change with respect to time however, during the time from switched on up to the time of steady state operation the electric field associated with the change in the magnetic vector potential changes from its maximum value (instantaneous rise) to zero while the electric field due to the gradient in the scalar potential field goes from zero to it maximum value which stabilizes at the electric field associated with the physical power supply source voltage.

Remembering that the current flowing in an inductor of N turns stores it's energy in the magnetic field (B) of the inductor during the on state via the curl of the magnetic vector potential (derived from the current) and is typically expressed by $B = \nabla \times A$ from Ampere's Law. Upon switching off the circuit a back electromotive force (Volts) develops across the inductor, in the opposite polarity, of almost pure voltage potential due to the fact that the circuit while energized with current has "instantaneously", for all intents and purposes, become an open circuit of very high impedance. Because the current vanished instantly the field collapses at a velocity approaching that of light. As EMF is directly related to velocity of flux, EMF tends towards infinity. This almost pure potential, activated during the switched off state can be further amplified, collected and utilized without an internal supply powering the circuit at periodic intervals.

By timing, switching, modulating, tuning, geometric proportioning, collecting and impedance optimization, one can maximize and utilize available energy from the scalar superpotential field with a fraction of the power from an equivalent continuous load AC generator.

SUMMARY OF THE INVENTION

The device and method of the present invention is a solid state electromagnetic generator that recovers and amplifies the combination of the forward and back electromotive force to an energy level of COP=0.97 or more or less, depending upon the circuit configuration, component ratings, coil geometry, transformer core magnetic properties, switching frequency, pulse duration, output impedance and number of paralleled circuit stages. The generator is initially energized from a small battery or a suitable sized mains power supply driven by a unipolar drive signal of the appropriate frequency and pulse width where upon de-energizing the generator the combination of the forward and backward electromotive forces are brought into a state of resonance with an associated voltage and current amplification. The amplified current produces a changing magnetic flux in a transformer core of suitable magnetic properties and geometry. The magnetic flux produces a current and electromotive force in the secondary of the transformer whose components are selected such that a state of resonance is maintained allowing essentially full power transfer less minute losses. The secondary side of the resonant circuit is further amplified by switching in and out a suitable sized inductor forming a parametric oscillator that resonates at a harmonic frequency of the fundamental formed by the energizing side of the circuit. The energy produced by both stages of amplification is captured and directed to a load while being isolated from the source dipole.

BRIEF DESCRIPTION OF THE DRAWINGS

FIG. 1 is an illustration of the typical operation of a normal isolation transformer alternating current (AC) power supply.

FIG. 2 is an illustration of the typical operation of a normal isolation transformer unipolar power supply where the forward and back electromotive force are resonated.

FIG. 3 is an illustration of the typical operation of a normal isolation transformer unipolar power supply where the back electromotive force is not resonated.

FIG. 4 is an illustration of the typical operation of a normal isolation transformer unipolar power supply where the transferred resonant electromotive force is further amplified by parametric oscillatory means.

FIG. 5 is an illustration of the generation circuit.

DETAILED DESCRIPTION OF THE INVENTION

Figure 6:
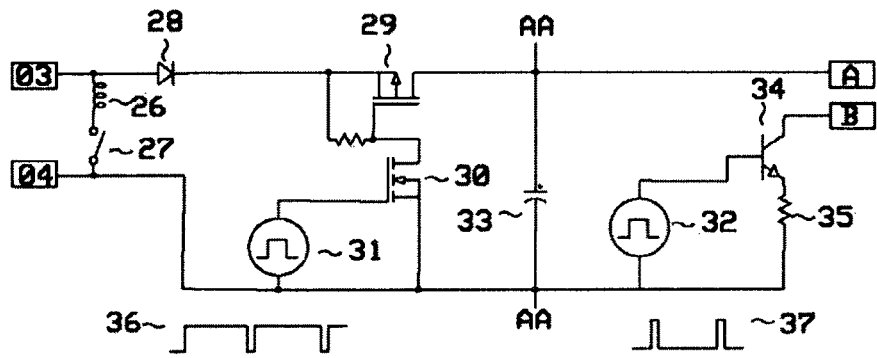
FIGS. 6 & 7 is an illustration of the switched isolation extraction circuits.

Suppose a circuit was employed as shown in FIG. 2. The circuit consists of a transistor switch (1) that is driven by a unipolar pulse width modulated signal (pwm) (2). The primary (3) of an isolation transformer (4) is connected between the collector/drain (5) of the transistor switch and the power supply (6) while the secondary of the isolation transformer (7) is placed in parallel (or series) with a capacitor (8) of suitable value and the resistive load (9). As the pwm signals the transistor in a fashion suitable for activating the transistor whereby changing the transistor state from off to on, so electron current is allowed to flow through the primary of the isolation transformer. The inductance of the primary of the isolation transformer acts in a manner such that it manifests a magnetic field oriented in a fashion such that it resists the change in the current flowing through the primary of the transformer thereby allowing a current of changing magnitude with respect to time to flow through the primary side circuit until if such time is allowed that the electron current reaches its steady state equilibrium magnitude.

If the pwm signal to the transistor is placed in a state where it changes the transistor state from on to off, the magnetic field in the primary inductance of the transformer becomes a power source or energy return by collapsing/changing with respect time but with a polarity which is reverse biased causing a reverse biased potential difference in the circuit which causes an electron current of reverse polarity to attempt to flow through the transistor however since the transistor is in an off state, the impedance of the transistor is of considerable magnitude which restricts the flow of the reversal current which causes an considerable gradient potential difference to develop across the transistor of such magnitude that significant damage to the transistor and other switching components can manifest. It is of common practice to place a reverse biased diode (See FIG. 3, (9)) in parallel with an inductance to redirect the electron current to a suitable component capable of storing the charge associated with this electron current.

It is of considerable importance to note that when the transistor is placed in its off/non-conducting state, the forward biased power supply is disconnected from the system and allows no dissipative electron current to flow through the system thereby allowing no work to be performed on the system by the physical power supply source however, since the collapsing field of the inductance of the primary of the transformer now becomes a power source during the part of the off state of the switching cycle, there exists the ability under the proper system conditions to extract useful energy from the energy return of equal or greater magnitude than what has been supplied to the system from the supply (6).

It is well known in the art that the gradient potential associated with the energy supply from the energy return into the system is sometimes called the back electromotive force (BEMF). Since the supply (6) is disconnected from the system, transistor switch (1) is nonconducting/no work being performed, during the extraction of the energy supplied from the energy return, the system has to be considered an open system and therefore the laws of thermodynamics and the law of conservation of energy hold true. The energy is simply supplied from the energy return.

Again referencing FIG. 2, meaningful amplification of the combined supply (6) and energy return supplied energy can occur if one institutes the appropriate frequency and pulse duration of a pwm signal such that a state of resonance occurs in the system whereby the self and mutual inductive and capacitive reactance's neutralizes one another and amplification of the absolute value of the combined internal and external gradient potentials occurs. The resultant output waveform in a state of resonance in this circuit configuration is and alternating current waveform. Hereto forward, this amplification shall be referred to as Stage 1 Amplification. In my device Stage 1 Amplification is achieved by pulsed width modulation of a generator circuit consisting of a high frequency flyback transformer (16) and a tuning capacitor (17) of FIG. 5.

It is of considerable importance to note that the switching signal driving the transistor switch that is connected to the primary side is unipolar with a pulse width typically of less than a half cycle and of equal importance to note that the output waveform of the secondary side of the transformer at resonance is an alternating current (AC) waveform as if the primary of the transformer was driven by a bipolar signal.

Figure 7:
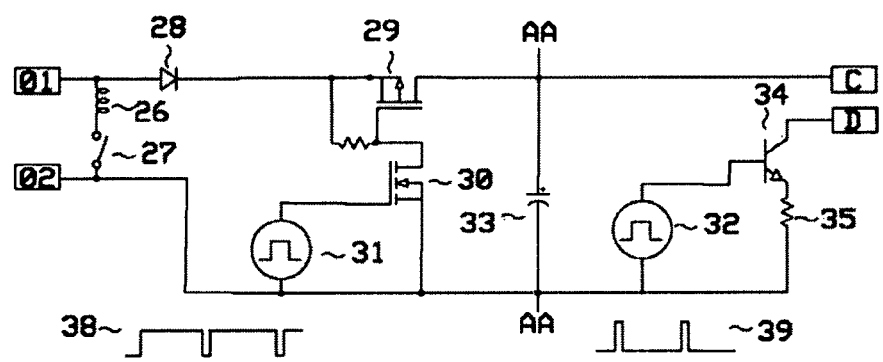

In FIG. 4, an interesting event occurs of considerable importance if a switchable inductance (10) is added in parallel, or series, with the transformer secondary coil (7) and the secondary capacitance (8). If the switch (11) is activated and deactivated forming a closed path of short duration at a frequency that is at the fundamental or a harmonic of the fundamental, an oscillatory harmonic resonant condition can occur whereby additional energy return supplied energy can be resonated into the secondary system for further amplification of the gradient potential in addition to the amplification resulting from Stage I Amplification. The waveform of the secondary already consisting of an AC waveform shape from the stage I amplification process is now further amplified by an increasing logarithmic factor which results in a new waveform which under proper system conditions, consists of a logarithmic increasing amplitude AC waveform that continuously increases in amplitude until either the system components give failure, which typically damages the system, or a system failure protection circuit is incorporated into the circuit such that it limits or controls the amplification magnitude. Saturation of transformer (4) must not be permitted. Hereto forward, the amplification process introduced by the system configuration of FIG. 4 shall be referred to as Stage II Amplification. Stage II Amplification can also occur using the switched inductor circuit (26) and (27) as shown in FIGS. 6 & 7 that is now inserted in a second electrically isolated circuit consisting of two isolation transformers (22) and (24) with tuned capacitors (23) and (25) from FIG. 5. Saturation of isolation transformers (22) and (24) must also not be permitted.

Figure 8:
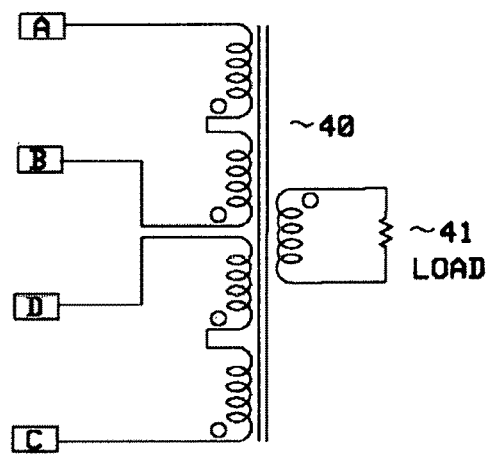
FIG. 8 represents a 60 Hz laminated steel stepdown isolation power transformer.

An extraction circuit also capable of controlling and maintaining a state of safe and optimal working circuit conditions is illustrated in FIGS. 6 & 7. Replacing the load (9) of FIG. 4 with a suitably sized extraction circuit as illustrated in FIGS. 6 and 7 consisting of a high voltage rectifier diode (28) for rectification of the high volt resonant energies circulating in the system, an isolation circuit consisting of high volt transistor switches (29) and (30) that is triggered by a pulse (31) or train of pulses (36) and (38) of appropriate timing that is used to isolate the Stage I and II amplification stages from the load discharging circuit (32), (34), and (35), a high voltage rated capacitor (33) of the appropriate size and storage rating that exhibits an impedance suitable for rapid charging and discharging to a 50-60 Hz frequency stepdown power transformer (40) of FIG. 8.

Recalling that the output waveform of Stage II Amplification has a logarithmic increasing amplitude, FIGS. 6 and 7 pwm waveform (36) and (38) is employed and illustrates transistor switches (30) of FIGS. 6 and 7 being placed in an on state so to allow the charging of the capacitor (33) to a predetermined voltage level within a predetermined amount of time. My device uses a 60 Hz pwm frequency (36) and (38) with a switched off time of 4 ms or less depending on the amplitude of the input voltage. PWM (36) & (38) are 180 degrees out of phase with one another so that bidirectional load discharging to power transformer (40) is attained to produce an AC 60 Hz output to power common devices requiring 120 VAC at 60 Hz output load (41). The switches (29), (30) and (34) employed in my device are rated to be capable of withstanding or blocking 5000 to 9000 volts depending on the application. At such time where the desired voltage level is achieved on capacitor (33), the transistor switches (29) and (30) are placed in an off state where no power is supplied by the supply (6) or the energy return and where the impedance between the amplification stage(s) and the charged capacitor are considerably high. To achieve additional impedance and electrical isolation between the generating transformer (16) circuit and the discharging circuit FIGS. 6 and 7, my device employs two 7000 volt rated diodes (19) and (21) and a decoupling capacitor (20) and, two additional high voltage high frequency transformers (22) and (24). This provides three layers of isolation while allowing resonant energies to efficiently transfer over before the extraction and discharge circuit FIGS. 6 and 7. This additional impedance is not a requirement however I find it to be highly effective in providing stable control between all stages of the device and improve efficiency. The generator transformer (16) of my device operates between a frequency of 40,000 to 70,000 cycles per second which is being driven by a timer circuit (12) capable of adjustable frequency, duty cycle, and enough output current to drive an optical isolator transistor gate driver (18). The charged capacitor (33) is then discharged into a load (41) via a step-down transformer (40). My device employs a laminated steel 10:1 step-down power transformer for 60 Hz 120 VAC operation to power common loads. Switch (34) of FIG. 6 discharges capacitor (33) when switch (29) of FIG. 6 is in the off state. The same applies for switch (34), capacitor (33) and switch (29) of FIG. 7 however the on states between FIG. 6 and FIG. 7 are 180 degrees out of phase so to produce an AC voltage output on load (41). The method just described ensures isolation of the output load from the amplification stages and the supply along with regulating the amount of amplified energy entering the system and stored in the capacitor (33) ensuring rated operating parameters are not exceeded. It should be noted that replacing capacitor (33) with a switched capacitor stepdown circuit can allow one to provide similar stage II amplification that (26) and (27) provides while also eliminating the need for a stepdown transformer (40) to make use of a only a 1:1 standard power transformer. This can improve efficiency further by reducing the windage and resistance loses associated with high voltage low frequency stepdown transformers.

My device can find its use in many practical applications. It can increase the output efficiency of solar power storage distribution systems. It can be utilized to increase the charging efficiency of battery chargers. It can increase the efficiency of emergency back-up battery powered systems or power standalone standard commercial 120 VAC 60 Hz loads very efficiently.

No laws of physics or thermodynamics have been violated in the present invention and the law of conservation of energy holds true. An open system not in thermodynamic equilibrium with the active vacuum flux operating under proper conditions becomes a sink for available energy return via the back electromotive force (BEMF) and can be further optimized by means of employing fundamental and harmonic resonant amplification techniques and extraction methods.

What I claim as my invention is:

1. A device system configured as a back electromotive force unipolar driven electromagnetic generator amplifier comprising;
   an extraction and amplification process for capturing and utilizing electromagnetic energy from the system further comprising;
      a pulse width modulation of the generator circuit for a duration less than a fraction of a cycle where return energy to the generator is converted and amplified and used over a full cycle,
      the system further comprising inductive and capacitive components, transistor switches and a low frequency isolation power transformer assembled in a manner such that available energy from the energy return can be extracted, collected and utilized to power standard commercial loads with increased efficiency with no moving parts.

\* \* \* \* \*